United States Patent [19]

Qi et al.

[11] Patent Number: 5,567,352
[45] Date of Patent: Oct. 22, 1996

[54] PHOSPHOR AND METHOD OF MAKING SAME

[75] Inventors: Ru-Yi Qi; Ronald E. Karam, both of Towanda, Pa.

[73] Assignee: Osram Sylvania Inc., Danvers, Mass.

[21] Appl. No.: 425,535

[22] Filed: Apr. 20, 1995

Related U.S. Application Data

[63] Continuation-in-part of Ser. No. 189,012, Jan. 28, 1994, abandoned, which is a continuation-in-part of Ser. No. 999,637, Dec. 31, 1992, abandoned.

[51] Int. Cl.$^6$ .................... C09K 11/54; C09K 11/70; C09K 11/57
[52] U.S. Cl. .................... 252/301.6 P; 252/301.4 P; 423/306; 423/307
[58] Field of Search ............ 252/301.4 P, 301.6 P; 423/306, 307

[56] References Cited

U.S. PATENT DOCUMENTS 5,185,180  2/1993  Kasenga et al. .................... 427/67
5,306,441  4/1994  Reddy et al. .................... 252/301.4 F

FOREIGN PATENT DOCUMENTS 2307863  12/1976  France .................... 252/301.4 F

OTHER PUBLICATIONS

Smith, "Luminescence of Three Forms of Zinc Orthophosphate:Mn", *Jour. Electrochem. Soc.*, Sep. 1951, pp. 363–368, vol. 98, No. 9.

K. Kuroda, M. Ogawa, T. Yanagisawa, & C. Kato, Layered Inorganic–Organic Nanocomposites: Application to Photofunctional Materials and Conversion to Inorganic Micropourous Materials, Nanophase and Nanocomposite Materials Symposium, Dec. 1–3 1992, Boston, MA, pp. 335–347.

Nenoff et al., The Low Temperature Synthesis and Characterization of Two Layered Materials Containing 3-Ring Groupings: $NaH(ZnPO_4)_2$ and $CsH(ZnPO_4)_2$, J. Solid State Chem., 107, pp. 285–295 (1993). no month.

*Primary Examiner*—Melissa Bonner
*Attorney, Agent, or Firm*—Robert F. Clark

[57] ABSTRACT

Inorganic intercalation phosphors were made by doping an inorganic intercalation compound having an atomic structure interspersed with vacant spaces with selected activator ions capable of luminescent emission when excited by ultraviolet light and/or cathode rays.

4 Claims, 1 Drawing Sheet

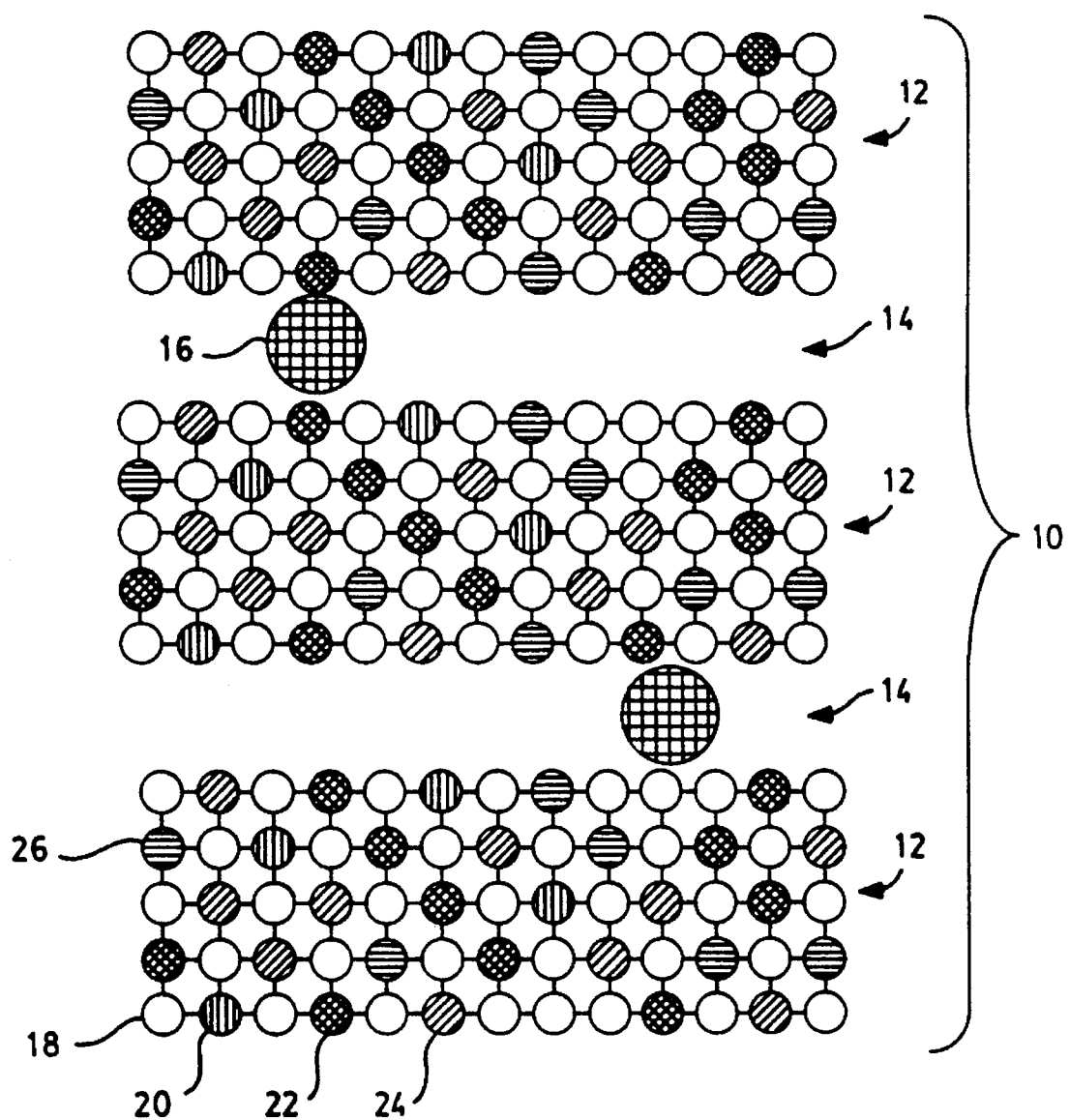

PHOSPHOR AND METHOD OF MAKING SAME

The United States Government has rights in this invention pursuant to U.S. Government Contract No. DAAL01-92-C-0241.

CROSS-REFERENCE TO RELATED APPLICATIONS

This application is a continuation-in-part of application Ser. No. 08/189,012, filed Jan. 28, 1994, now abandoned, which is a continuation-in-part of application Ser. No. 07/999,637, filed Dec. 31, 1992, now abandoned, the disclosures of which are hereby incorporated by reference. This application is related to copending applications Ser. Nos. 08/425,849, 08/425,848, and 08/425,536, all filed Apr. 20, 1995.

TECHNICAL FIELD

This invention relates to phosphors and methods of making them. In particular, it relates to inorganic intercalation phosphors made by doping inorganic intercalation compounds with selected activator ions which, when excited by ultraviolet light, cathode rays or other exciting radiation, are capable of luminescent emission.

BACKGROUND ART

In present day society, there exist numerous applications for phosphors. For example, phosphors are critical components in a number of lamp types, electroluminescent devices, and cathode ray tubes for televisions and computer monitors. Generally, the performance of these devices can be directly linked to the performance of the phosphors which they incorporate. Thus, in order to promote the evolution of these technologies, it is essential that new phosphors routinely be developed which could be used in those applications.

For lighting applications, it is desirable that phosphors luminesce when stimulated by ultraviolet radiation (UV), which is generally defined as the portion of the electromagnetic spectrum between about 4–400 nm. Such UV excitable phosphors are defined as being photoluminescent. Photoluminescent phosphors find use in a number of different lamp types including fluorescent, high pressure mercury and neon sign lamps. For fluorescent lighting applications, it is particularly important that phosphors be stimulable by the primary ultraviolet emissions from low pressure mercury discharges which occur at 185 and 254 nm.

For cathode ray tube applications, it is necessary that phosphors luminesce when excited by cathode ray radiation (CR), which consists of high energy electrons. Phosphors which are excited by cathode rays are defined as being cathodoluminescent. Although it is desirable that cathodoluminescent phosphors emit light over the entire range of the visible spectrum, phosphors that emit red, green and blue light are particularly important for use in the manufacture of luminescent screens for televisions and computer monitors.

Finally, most phosphors which are cathodoluminescent and/or photoluminescent are also electroluminescent and would likely be usable in electroluminescent devices. Thus, it would be an advantage in the art to provide novel phosphors which are capable of luminescent emission when excited by either ultraviolet radiation or cathode rays or both.

SUMMARY OF THE INVENTION

It is an object of this invention to provide an inorganic intercalation phosphor capable of luminescent emission when excited by ultraviolet and/or cathode rays.

It is a further object of this invention to provide a method for producing an inorganic intercalation phosphor.

In accordance with one object of the invention, an inorganic lamellar intercalation compound, $NaH(ZnPO_4)_2$, is activated with manganese to provide a red-emitting phosphor having the general formula, $NaH(Zn_{1-x}Mn_xPO_4)_2$, where x is between about 0.02 to about 0.12.

In accordance with another object of the invention, an inorganic intercalation phosphor having the general formula $NaH(Zn_{1-x}Mn_xPO_4)_2$, where x is between about 0.02 to about 0.12, is made by the steps of: forming an aqueous mixture by combining appropriate quantities of $NaH_2PO_4 \cdot H_2O$, $MnCl_2 \cdot 4H_2O$, and aqueous solutions of $NaOH$ and $Zn(NO_3)_2$, with water, and heating the aqueous mixture in an enclosed vessel at about 70° C. for about 4–5 days.

BRIEF DESCRIPTION OF THE DRAWINGS

The FIGURE is a schematic diagram representing the approximate atomic structure of fluorophlogopite, an inorganic intercalation compound.

BEST MODE FOR CARRYING OUT THE INVENTION

For a better understanding of the present invention, together with other and further objects, advantages and capabilities thereof, reference is made to the following specification and appended claims.

Numerous inorganic intercalation compounds are known. They generally have an atomic structure characterized by the presence of ionically bonded atoms in substructures interspersed with vacant spaces which are sufficiently large to accommodate foreign atoms or molecules within them. Intercalation compounds are generally of three types: lamellar, or layered, compounds; channel-type compounds; and cage-type compounds.

In lamellar intercalation compounds the atomic substructures comprise layers, or lamellae, of ionically bonded inorganic atoms. The lamellae themselves are bonded together by relatively weak forces, known as Van der Waals forces. The relatively weak Van der Waals forces between the lamellae permit the entry of foreign atoms or molecules into the spaces (hereinafter referred to as "Van der Waals spaces") between the lamellae. The Van der Waals spaces in lamellar intercalation compounds are large enough to accommodate foreign atoms or molecules which may be introduced by various methods, such as, for example, ion exchange, diffusion, acid-base reactions and electrochemical reactions.

In channel-type intercalation compounds the atomic substructures comprise zones of ionically bonded inorganic atoms which are interspersed with networks of vacant channels which are sufficiently large to accommodate foreign atoms or molecules within them. In cage-type intercalation compounds the atomic substructures of ionically bonded atoms are interspersed with vacant holes, or cages, which are sufficiently large to accommodate foreign atoms or molecules within them. The vacant channels or cages are interspersed throughout the atomic structure of the intercalation compound.

The lamellae of a crystal of a lamellar inorganic intercalation compound are generally parallel to the long axis of the crystal, whereas the channels of a channel-type inorganic intercalation compound crystal, and the cages or holes of a cage-type crystal, may be more randomly oriented.

Suitable inorganic intercalation compounds include vermiculites, micas, fluoromicas, xerogels (such as, for example, vanadium pentoxide made by sol-gel processing), iron oxychloride, zirconium phosphates, and zeolites.

Vermiculite is a lamellar intercalation compound which has the idealized general formula $(Ca,Mg)_{x/2}(Mg,Fe,Al)_3[(Al,Si)_4O_{10}](OH)_2$, where the first listed calcium and magnesium ions are exchangeable cations which reside in the interlamellar Van der Waals spaces, and x is any integer. Mica is another type of lamellar intercalation compound having the general idealized formula $M_x(Si_4O_{10})(OH)_2$, where M is an exchangeable cation, typically aluminum or magnesium, and x is any integer. Fluoromicas, which are similar in structure to vermiculites, have the general idealized formula $(Ca,Mg)_{x/2}(Mg,Fe,Al)_3[(Al,Si)_4O_{10}]F_2$. An example of a fluoromica is fluorophlogopite, which has the general formula $KMg_3(Si_3Al)O_{10}F_2$.

The FIGURE is a schematic representation of the lamellar atomic structure of fluorophlogopite. Fluorophlogopite 10 is comprised of atoms of oxygen 18, aluminum 20, silicon 22, magnesium 24 and fluorine 26 which are ionically bonded together into atomic substructures 12. Between the atomic substructures 12 are Van der Waals spaces 14 in which reside potassium atoms 16.

Zirconium phosphates have the general formula $Zr(MPO_4)_2 \cdot xH_2O$, where M is a monovalent exchangeable cation and x is any integer.

Zeolites are crystalline aluminosilicate intercalation compounds having an atomic structure which is interspersed with networks of channels and/or cages filled with exchangeable cations and water. Zeolites have the general formula $M_xD_y(Al_{x+2y}Si_{n-(x+2y)}O_{2n}) \cdot mH_2O$, where M is a monovalent or divalent exchangeable cation and x and y are any integers. The channels and/or cages within the zeolite structure are sufficiently large to accommodate foreign atoms or molecules within them, including organic polymers, which may be introduced by the previously described methods.

The inorganic intercalation compounds are doped with selected activator ions which are capable of luminescent emission under cathodoluminescent, fluorescent, x-ray or electroluminescent excitation. The following table lists several activator ions suitable for doping, along with the probable emission color from each. The precise emission colors obtained will depend on the site occupied by the particular activator ion in the lattice of the inorganic intercalation compound.

TABLE 1

| ACTIVATOR ION DOPANTS AND THEIR EMISSION COLORS | | |
|---|---|---|
| RED | GREEN | BLUE |
| $Mn^{+2}$ | $Mn^{+2}$ | $Sb^{+3}$ |
| $Mn^{+4}$ | $Eu^{+2}$ | $Ti^{+4}$ |
| $Fe^{+3}$ | $Tb^{+3}$ | $Sn^{+2}$ |
| $Eu^{+3}$ | | $Tm^{+3}$ |
| $Sm^{+3}$ | | $Eu^{+2}$ |
| $Cr^{+3}$ | | $Ce^{+3}$ |

The activator ions may be doped into the atomic lattice of the inorganic intercalation compound by several methods, including high-temperature solid-state synthesis (generally in excess of 1000° C.), hydrothermal synthesis, wet-chemical procedures and low-temperature procedures. The activator ions generally occupy lattice sites within the atomic structure of the inorganic intercalation compound. For example, when an inorganic intercalation compound, such as fluorophlogopite, is doped with manganese ions, the manganese ions replace a small fraction of the magnesium ions in the fluorophlogopite atomic structure.

Fluxing agents, such as, for example, sodium chloride or barium chloride, may be used during the doping process, although they are not generally required.

The doped inorganic intercalation compound may be excited with, for example, cathode ray or ultraviolet radiation, to determine its luminescence intensity and its emission color. Luminescence intensity of the doped inorganic intercalation compound may be optimized by varying the amounts of the desired dopant ions.

Another lamellar intercalation compound is $NaH(ZnPO_4)_2$. This compound consists of a two-dimensional network of $ZnO_4$ and $PO_4$ tetrahedra, linked through oxygen vertices, to form a structure whose interlayers are occupied by charge-balancing cations. The small interlayer sodium cations allow for hydrogen bonding between the layers, resulting in puckered sheets. Luminescent forms of $NaH(ZnPO_4)_2$ can be made by doping with various activator ions. In particular, a red emitting phosphor has been achieved by doping $NaH(ZnPO_4)_2$ with small amounts of manganese to yield a phosphor having the general formula $NaH(Zn_{1-x}Mn_xPO_4)_2$, where x ranges between $0.02 \leq x \leq 0.12$. Specific examples of the phosphor are given below.

The $NaH(Zn_{1-x}Mn_xPO_4)_2$ phosphors were prepared using a hydrothermal method which involves mixing appropriate quantities of aqueous solutions of NaOH and $Zn(NO_3)_2$, with $MnCl_2 \cdot 4H_2O$, $NaH_2PO_4 \cdot H_2O$ and de-ionized $H_2O$ and heating the mixture to about 70° C. in an enclosed vessel for several days until the reaction is complete.

The following non-limiting examples are presented. Typical UV excitation was performed with the 254 nm line from a mercury discharge. Cathode ray excitation was typically performed using a focused high energy electron beam at 10 kV, 10 uA or 15 kV, 8 uA. Brightness measurements are given in foot-Lamberts (fL).

Manganese activated $NaH(Zn_{1-x}Mn_xPO_4)_2$ phosphor samples were prepared by combining appropriate amounts of 4M NaOH and 2M $Zn(NO_3)_2$ with $NaH_2PO_4 \cdot H_2O$, $MnCl_2 \cdot 4H_2O$ and 30 ml of de-ionized (DI) $H_2O$ and mixing with a magnetic stirrer for about one hour. The amounts of the reactants are given in the following table. The reactant mixtures were charged into a Teflon bomb and heated at about 70° C. for 4–5 days. X-ray diffraction and SEM analyses confirmed a single-phase product, characteristic for $NaH(ZnPO_4)_2$. Red-emitting $NaH(Zn_{1-x}Mn_xPO_4)_2$ phosphors having manganese doping levels from $0.02 \leq x \leq 0.12$ are described below.

|  | Example 1 | Example 2 | Example 3 | Example 4 | Example 5 |
|---|---|---|---|---|---|
| $NaH_2PO_4 \cdot H_2O$ (g) | 24.84 | 24.84 | 24.84 | 24.84 | 24.84 |
| 4M NaOH (g) | 10.28 | 12.54 | 10.30 | 10.28 | 10.33 |
| 2M $Zn(NO_3)_2$ (g) | 22.81 | 22.35 | 21.88 | 21.49 | 20.49 |
| $MnCl_2 \cdot 4H_2O$ (g) | 0.1430 | 0.3368 | 0.4278 | 0.6729 | 0.8546 |
| DI $H_2O$ (ml) | 30.0 | 30.0 | 30.0 | 30.0 | 30.0 |
| x in $NaH(Zn_{1-x}Mn_xPO_4)_2$ | 0.02 | 0.047 | 0.06 | 0.094 | 0.12 |
| CR Brightness (foot-lamberts) | 1.35 | 1.16 | 2.15 | 1.60 | 1.84 |

All samples exhibited a red emission under ultraviolet (UV) and cathode ray (CR) excitation. The CR emission peak was centered at about 650 nm. The optimum brightness, 2.15 fL was achieved at about x=0.06. At the highest dopant level, a manganese containing minor phase with a brown body color was observed.

While there have been shown what are at present considered to be the preferred embodiments of the invention, it will be apparent to those skilled in the art that various changes and modifications can be made herein without departing from the scope of the invention as defined by the appended claims.

We claim:

1. A phosphor having the general formula $NaH(Zn_{1-x}Mn_xPO_4)_2$ where x is between about 0.02 to about 0.12.

2. The phosphor of claim 1 wherein x is about 0.06.

3. A method for making a phosphor having the general formula $NaH(Zn_{1-x}Mn_xPO_4)_2$, where x is between about 0.02 to about 0.12, comprising the steps of forming an aqueous mixture by combining appropriate quantities of $NaH_2PO_4 \cdot H_2O$, $MnCl_2 \cdot 4H_2O$, and aqueous solutions of NaOH and $Zn(NO_3)_2$, with water, and heating the aqueous mixture in an enclosed vessel at about 70° C. for about 4–5 days.

4. The method of claim 3 wherein the aqueous solutions of NaOH and $Zn(NO_3)_2$ have concentrations of 4M and 2M, respectively.

* * * * *